United States Patent Office 2,983,697
Patented May 9, 1961

2,983,697
TRIS-TRIORGANOSILYL-BORATE CONTAINING DIORGANOPOLYSILOXANE ELASTOMERS

Eric D. Brown and Melvin J. Hunter, Midland, Mich., assignors to Dow Corning Corporation, Midland, Mich., a corporation of Michigan
No Drawing. Filed June 6, 1958, Ser. No. 740,211
5 Claims. (Cl. 260—37)

This invention relates to a type of diorganopolysiloxane elastomer in which is incorporated a tristriorganosilyl-borate.

The incorporation of boric acid, boric acid anhydride and alkyl borates into siloxane elastomers in very small amounts is well known in the art to improve handling and extrudability of the elastomers by making them less sticky. More recently trialkyl borates have been employed in siloxane elastomers in larger amounts to give the elastomers the property of adhesion only to itself as shown in the copending application Serial No. 696,623 of Jack R. Harper and Joseph W. Keil, filed November 15, 1957, and entitled "Autoadhering Silicone Rubber."

However, it has not been suggested that any boron compound would retard the crepe hardening of siloxane elastomers. Crepe hardening is apparently caused by some interaction of silicon-bonded hydroxyls existing in the polymer with themselves and with hydroxyl groups on the surface of fillers. The result of crepe hardening is a stiffening in the unvulcanized gum. When a stock has excessively crepe hardened it becomes impossible to further "work" it, i.e. to satisfactorily disperse additives or to press-mold the stock itself. Various additives are effective in preventing crepe hardening depending on the particular combination of gum and filler.

While the effectiveness of a boron crepe hardening retardant is proportional above a certain minimum to the amount of boron present, generally an increase in the amount of the boron compound also adversely affects other physical properties, such as, for example, increasing tension set, i.e. decreasing the elastomeric properties.

It is an object of this invention, therefore, to produce a boron-containing rubber stock having a lower tension set than previously known while maintaining satisfactory crepe hardening resistance. Another object of this invention is to achieve a boron-containing siloxane rubber having these desired properties while employing less boron than has heretofore been required. Still another object is to obtain such a rubber which is easily extruded and has good electrical properties.

This invention relates to a composition of matter comprising a mixture of (1) a diorganopolysiloxane, (2) from .01 to .16 part, preferably from .02 to .06 part, per 100 parts of (1) of boron added as a tris-triorganosilyl-borate and (3) a reinforcing silica filler.

Siloxane (1) can have a viscosity as low as 10,000 cs. at 25° C. and must contain at least 50 mol percent dimethylsiloxane units. While essentially all of the units in siloxane (1) are diorganosiloxane units, small amounts of triorganosiloxane, monoorganosiloxane and $SiO_2$ units can be present as is well known in the art. The other organic radicals in siloxane (1) and the organic radicals present in the triorganosilyl groups of the borate can be monovalent hydrocarbon radicals or halogenated monovalent hydrocarbon radicals.

Examples of the halogenated or non-halogenated monovalent hydrocarbon radicals which can be present in siloxane (1) and in the triorganosilyl groups of the borate (2) are alkyl radicals such as methyl, ethyl, isopropyl, tert-butyl and octadecyl; alkenyl radicals such as vinyl, allyl, methallyl, dodecenyl and butadienyl; cycloalkyl radicals such as cyclopentyl and cyclohexyl; cycloalkenyl radicals such as cyclopentenyl and cyclohexadienyl; aryl radicals such as phenyl, xenyl and naphthyl; aralkyl radicals such as benzyl; alkaryl radicals such as tolyl; alkaralkyl radicals such as xylyl and the corresponding halogenated derivatives such as chloromethyl, 3,3,3-trifluoropropyl, $\alpha$-chloro-$\alpha,\beta,\beta$-trifluorocyclobutyl, 2-bromovinyl, 2,3-dibromo-2-cyclopentenyl, $\alpha,\alpha$-difluorobenzyl, perchlorophenyl $\alpha,\alpha,\alpha$-trifluorotolyl, and 2,4,6-tribromobenzyl.

The diorganopolysiloxane then can be dimethylpolysiloxane or a copolymer containing at least 50 percent dimethylsiloxane units with other diorganosiloxane units composed of any combination of the previously discussed types of radicals. Examples of such copolymers include a copolymer of 50 mol percent dimethylsiloxane units, 40 mol percent of phenylmethylsiloxane units and 10 mol percent of methylvinylsiloxane units; a copolymer of 70 mol percent dimethylsiloxane units and 30 mol percent 3,3,3-trifluoropropylmethylsiloxane units; a copolymer of 80 mol percent dimethylsiloxane units, 5 mol percent phenyl-$\alpha,\alpha,\alpha$-trifluorotolylsiloxane units, 5 mol percent $\alpha$-chloro-$\alpha,\beta,\beta$-trifluorocyclobutylmethylsiloxane units, 5 mol percent phenylmethylsiloxane units, 3 mol percent diphenylsiloxane units, 1.9 mol percent bis-2-bromoethylsiloxane units, .04 mol percent dimethyl-2-bromovinylsiloxane units, .04 mol percent monophenylsiloxane units and .02 mol percent $SiO_2$ units. These copolymers merely represent the types of diorganopolysiloxane which are operative in this invention.

If less than 50 mol percent of the siloxane is made up of dimethylsiloxane units, the effectiveness of the borate employed in this invention is reduced to a point where it provides no benefit over the previously employed crepe hardening retardants. If too many triorganosiloxane units or monoorganosiloxane units or $SiO_2$ units in any combination are present, the physical properties of both the uncured gums and the cured elastomers will be adversely affected.

Siloxane (1) can be a mixture of polymers, homopolymers or copolymers, but it has generally been found that any mixture has undesirable characteristics which do not appear in the copolymer having the equivalent siloxane units as are present in the mixture. However, where any polymer in such a mixture falls within the limitations of siloxane (1), the special benefits of the composition of this invention will be proportionately apparent.

The tris-triorganosilyl-borate (2) which is employed in this invention has the general configuration $(R_3SiO)_3B$, where R represents any of the monovalent hydrocarbon radicals or halogenated monovalent hydrocarbon radicals which can be present in the siloxane units of siloxane (1). They are prepared generally by the heating at reflux $R_3SiCl$ and boric acid for 24 hours or longer and distilling out the product. Preferably, R is methyl but this preference is only a practical limitation in that it means the addition of a minimum amount of extraneous organic material to the silicone rubber stock. This practical limitation, however, is not to be construed as a critical limitation because this type of borate is operative no matter which of the defined halogenated or non-halogenated monovalent hydrocarbon radicals are substituted for R.

When the amount of boron incorporated into the compositions of this invention is less than 0.01 part per 100 parts of siloxane (1), the effect of the boron is negligible for the prevention of crepe hardening. When the amount of boron is greater than .16 part per 100 parts of siloxane (1), the additional boron does not produce a proportional improvement in the crepe hardening resistance of the composition and degrades other physical properties. These boron compounds can be added as mixtures also, The effect of the borates employed herein is found only where reinforcing silica fillers are employed in the rubber stock. A reinforcing filler is here defined as one having a surface area of at least 50 square meters per gram. For the purpose of this invention there is no critical upper limit to the surface area. For example, the surface area may be 900 square meters per gram or above. Such fillers include silica aerogels, fume silicas and xerogels and can be present in amounts, for example, of from 5 to 100 parts, preferably 15 to 80 parts, per 100 parts of siloxane (1).

Also operative in this invention are reinforcing fillers treated as described in U.S. Patent 2,610,167. The silicas described therein are treated by reaction with reactive silanes such as hydrolyzable organosilicon halides or silazanes or to some extent with organosilicates in vapor, liquid or inert solvent solution.

Specific examples of organosilyl groups which may be attached to the surface of the silica through SiOSi linkages are monomethylsilyl, monooctadecylsilyl, monophenylsilyl, diethylsilyl, monovinylsilyl, triphenylsilyl, and combinations of dimethylsilyl and trimethylsilyl. In short, for the purpose of this invention the organic radicals of the organosilicon compounds used in treating filler can be any monovalent hydrocarbon radicals of 18 or less carbon atoms such as alkyl radicals such as methyl, butyl, isopropyl, or tertiary butyl; alkenyl radicals such as hexenyl, oleyl, or allyl; cycloaliphatic hydrocarbon radicals such as cyclohexyl, cyclohexenyl, cyclopentyl, or methylcyclohexyl; aromatic hydrocarbon radicals such as tolyl, xenyl, naphthyl and anthracyl; and aralkyl hydrocarbon radicals such as benzyl.

These fillers can also be treated by reacting colloidal silica with a hydrocarbon alcohol. Specific examples of the hydrocarbonxy groups which can be attached to the surface of the silica are methoxy, ethoxy, butoxy, octadecyloxy, allyloxy, cyclohexyloxy, phenoxy, 2,2,4-trimethylhexyloxy, isopropoxy, benzloxy, cinnamyloxy, proparagyloxy and oleyloxy.

If desired, the compositions of this invention may also contain fillers having a surface area less than 50 square meters per gram such as diatomaceous earth, crushed quartz, sand or metallic oxides such as titania, zinc oxide and the like.

If desired, the compositions of this invention can also contain curing catalysts. Examples of such catalysts are of two types. In those cases where there is no SiH or alkyl silicate in the system the preferred catalysts are organic peroxides such as benzoyl peroxide, bis-dichlorobenzol peroxide and dicumyl peroxide. In such cases the curing occurs by action of the peroxide on the organic groups in the siloxane. In those cases where there is SiH in the system as a part of siloxane (1) or where siloxane (1) is mixed with alkyl polysilicates or an SiH containing siloxane, salts of carboxylic acids, such as lead 2-ethylhexoate, dibutyltindilaurate, stannous octoate and ferric naphthenate, are effective catalysts.

Radiation such as high energy electrons, gamma rays and Roentgen rays can also cure the compositions of this invention. In such cases no curing catalyst is required.

The compositions of this invention are prepared by merely mixing together at least the necessary components in any conventional manner, preferably by milling. If desired, a vulcanizing agent can be added at the same time if it is non reactive under the mixing conditions or the vulcanizing agent can be added at the time the composition is to be used.

The compositions of this invention can also contain other additives such as pigments, oxidation inhibitors, compression set additives and the like.

The compositions of this invention have excellent extrudability and millability, good moisture resistance both before and after vulcanization, high tensile strength and excellent electrical properties as compared to similar compositions containing alkyl borates and the like. Furthermore, the instant compositions can be devolatilized by heating without appreciably diminishing the crepe hardening resistance of the stock. These compositions are useful for fabricating rubber articles such as insulating tape.

The following examples are illustrative and should not be construed as limiting the invention which is properly set forth in the appended claims.

EXAMPLE 1

The following basic formulation was employed in this example:

100 parts by weight of a dimethylpolysiloxane gum having a Williams plasticity of 0.040 inch and containing 0.142 mol percent methylvinylsiloxane units and containing in addition vinyldimethylsiloxane endblocking units in sufficient proportions to give a ratio of one vinyl group in an endblocking unit per 5000 silicon atoms 35 parts by weight of a fume silica having a surface area of approximately 150 to 200 square meters per gram 0.5 part by weight of iron oxide 1.0 part by weight bis-dichlorobenzoyl peroxide The last two ingredients were added dispersed in dimethylpolysiloxane pastes in order to aid dispersion in the gum and filler.

Six samples of this stock were prepared. To four of these samples (Samples 1 to 4 inclusive) was added boron as tris-trimethylsilyl-borate in the amounts shown below. Triethylborate was added to the fifth sample (Sample 5), and the sixth sample (Sample 6) with no boron compound added was used as a control. Part of each sample was aged three days and then "softened," i.e. milled until soft enough to form a wrinkle-free sheet on the mill roll. The rest of each sample was aged for two weeks before milling. The time necessary to "soften" the aged stock was recorded. Subsequently each sample was press-molded for 5 minutes at 125° C. The vulcanized samples were than tested for tension set. Subsequently, the samples which had aged two weeks before press-molding were cured for 24 hours at 250° C. and measured for compression set after being heated at 150° C. for 22 hours under compression. The results were as follows:

Table

| Sample | Amount of Boron added (parts by weight) | Softening time after 3 days' aging, seconds | Tension set (percent) as molded after 3 days' aging | Softening time after 2 weeks' aging, seconds | Tension set (percent) as molded after 2 weeks' aging | Compression set (percent) after 22 hours at 150° C. of stock cured for 24 hours at 250° C. |
|---|---|---|---|---|---|---|
| 1 | 0.04 | 60 | 10 | 305 | 3 | 19.7 |
| 2 | 0.08 | 30 | 28 | 140 | 20 | 36.0 |
| 3 | 0.12 | 15 | 24 | 75 | 17 | 39.0 |
| 4 | 0.16 | 0 | 20 | 30 | 24 | 47.8 |
| 5 | 0.11 | 90 | 20 | 295 | 10 | 29.6 |
| 6 | 0 | 900 | 12 | failed to soften | unable to mold | |

It will be noted that the softening time of the sample containing boron as triethylborate, i.e., Sample 5, is approximately equivalent to the softening time of the sample containing one-third as much boron in the form of tris-trimethylsilyl-borate (Sample 1). The softening time is an indication of the amount of crepe hardening which occurred in the aging periods specified and therefore an index of the crepe hardening resistance of the boron-containing siloxanes. Consequently, Sample 5 should be compared to Sample 1 as having the closest comparative crepe-hardening resistant properties. From this experiment it was found that boron added as tris-trimethylsilyl-borate to a siloxane gave a composition having one-half to one-third the tension set and the same crepe hardening resistance as a stock containing almost three times as much boron added as triethylborate.

EXAMPLE 2

When any of the following polysiloxane gums are substituted for the dimethylpolysiloxane gum of Example 1, rubbers having similar excellent properties are produced:

A vinyldimethylsiloxy - endblocked dimethylpolysiloxane having a viscosity of 11,000 cs. at 25° C.

A hydroxy-endblocked dimethylpolysiloxane gum having a Williams plasticity of .080 inch A copolymer consisting of 55 mol percent dimethylsiloxane units, 27 mol percent 3,3,3-trifluoropropylmethylsiloxane units, 9 mol percent methylvinylsiloxane units, 5 mol percent α,α,α-trifluorotolylbenzylsiloxane units, 3.9 mol percent diphenylsiloxane units and .1 mol percent trimethylsiloxy units A hydroxy-endblocked copolymer consisting of 85 mol percent dimethylsiloxane units, 5 mol percent chlorophenyl-2,2-dibromoethylsiloxane units, 5 mol percent bis-chloromethylsiloxane units, 3 mol percent cyclohexylcyclopentenylsiloxane units and 2 mol percent octadecylmethylsiloxane units having a Williams plasticity of 0.060 inch A hydroxy-endblocked copolymer of 70 mol percent dimethylsiloxane units and 30 mol percent phenylmethylsiloxane units and having a Williams plasticity of .070 inch A hydroxy-enblocked copolymer of 65 mol percent dimethylsiloxane units, 30 mol percent phenylmethylsiloxane units, 5 mol percent methylvinylsiloxane units and having a Williams plasticity of 0.020 inch.

EXAMPLE 3

When a silica aerogel having a surface area of 100 square meters per gram and treated with methyltrichlorosilane vapor is substituted for the fume silica of Example 1, the resulting compositions have similar properties to those of Example 1 and show the same relative variations in physical properties.

EXAMPLE 4

When the following borates are substituted for the tris-trimethylsilyl-borate of Example 1, rubbers having similar physical properties are produced:

Tris-triethylsilyl borate
Tris-3,3,3-trifluoropropyldimethylsilyl borate
Tris-phenyldimethylsilyl borate
Triethylsilyl-bis-tri-t-butylsilyl borate
Tris-chlorophenyldimethylsilyl borate
A mixture of 90 percent by weight tris-trimethylsilyl borate and 10 percent by weight tris-trioctadecylsilyl borate
Tris-dimethylvinylsilyl borate That which is claimed is:

1. A composition of matter comprising a mixture of (1) a diorganopolysiloxane having a viscosity of at least 10,000 cs. at 25° C. and in which the organic radicals are selected from the group consisting of monovalent hydrocarbon radicals and halogenated monovalent hydrocarbon radicals and which contains at least 50 mol percent dimethylsiloxane units, (2) from .01 to .16 parts by weight per 100 parts of (1) of boron added as a tris-triorganosilyl-borate in which the organic radicals are selected from the group consisting of halogenated and nonhalogenated monovalent hydrocarbon radicals and (3) a reinforcing silica filler having a surface area of at least 50 square meters per gram, said composition being curable to a solid coherent elastomer having a compression set of less than 50% after compression for 22 hours at 150° C.

2. The composition of claim 1 in which all the organic radicals in (1) are methyl, phenyl and vinyl radicals and (2) is tris-trimethylsilylborate.

3. The composition of claim 1 in which all the organic radicals in (1) are methyl and phenyl radicals and (2) is tris-trimethylsilylborate.

4. The composition of claim 1 in which all the organic radicals in (1) are methyl and vinyl radicals and (2) is tris-trimethylsilylborate.

5. The composition of claim 1 in which all the organic radicals in (1) are methyl radicals and (2) is tris-trimethylsilylborate.

References Cited in the file of this patent

UNITED STATES PATENTS

| | | |
|---|---|---|
| 2,440,101 | Krieble | Apr. 20, 1948 |
| 2,541,851 | Wright | Feb. 13, 1951 |
| 2,721,857 | Dickmann | Oct. 25, 1955 |

FOREIGN PATENTS

| | | |
|---|---|---|
| 531,785 | Canada | Oct. 16, 1956 |